United States Patent
Lemieux et al.

(10) Patent No.: US 12,273,216 B2
(45) Date of Patent: Apr. 8, 2025

(54) SYSTEM AND METHOD FOR CONTROLLING MULTIPLE SERIAL CONTROL DEVICES IN AN EMERGENCY VEHICLE

(71) Applicant: WHELEN ENGINEERING COMPANY, INC., Chester, CT (US)

(72) Inventors: Kenneth S. Lemieux, Groton, CT (US); Cole Jackson, Cheshire, CT (US); Eric Russell, Middletown, CT (US); Tomasz Walczak, New Haven, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 16/815,785

(22) Filed: Mar. 11, 2020

(65) Prior Publication Data
US 2020/0295965 A1    Sep. 17, 2020

Related U.S. Application Data

(60) Provisional application No. 62/817,723, filed on Mar. 13, 2019.

(51) Int. Cl.
*H04L 12/40* (2006.01)
*B60Q 1/26* (2006.01)
(Continued)

(52) U.S. Cl.
CPC ............ *H04L 12/40* (2013.01); *B60Q 1/2611* (2013.01); *B60Q 1/52* (2013.01); *G06F 9/4411* (2013.01);
(Continued)

(58) Field of Classification Search
CPC ........... H04L 12/40; H04L 2012/40215; H04L 61/6027; H04L 61/2038; B60Q 1/2611; B60Q 1/52; G06F 9/4411; G06F 12/0661
See application file for complete search history.

(56) References Cited

U.S. PATENT DOCUMENTS

| | | | |
|---|---|---|---|
| 6,449,715 B1 * | 9/2002 | Krivoshein | ........... H04L 41/022 713/1 |
| 11,169,797 B2 * | 11/2021 | Mezaael | ................. H04W 4/40 |

(Continued)

FOREIGN PATENT DOCUMENTS

| | | |
|---|---|---|
| EP | 1351108 B1 | 6/2015 |
| EP | 3518505 A1 | 7/2019 |

(Continued)

OTHER PUBLICATIONS

European Office Action dated Aug. 11, 2022, corresponding European Application No. 20716660.4-1203.

(Continued)

*Primary Examiner* — Idriss N Alrobaye
*Assistant Examiner* — Richard B Franklin
(74) *Attorney, Agent, or Firm* — HOGAN LOVELLS US LLP

(57) ABSTRACT

A system, method and storage medium for configuring and operating a plurality of serial devices in an emergency response vehicle. The system may include a plurality of peripheral devices, each configured to receive and store an address, a controller configured to transmit addressable commands to each of the devices, at least two of the devices having a first device type wherein the addresses of each of the devices are selectable by a user. The method may include selecting a plurality of peripheral devices, each configured to receive and store an address, with at least two of the devices have a same device type, connecting each of the devices to a computer executing configuration software, detecting each (Continued)

of the devices, receiving an address for at least one of the devices, and storing the address in a storage medium.

22 Claims, 8 Drawing Sheets

(51) Int. Cl.
 *B60Q 1/52* (2006.01)
 *G06F 9/4401* (2018.01)
 *G06F 12/06* (2006.01)
(52) U.S. Cl.
 CPC .............. *G06F 12/0661* (2013.01); *H04L 2012/40215* (2013.01)

(56) References Cited

U.S. PATENT DOCUMENTS

| | | | | |
|---|---|---|---|---|
| 2003/0158635 | A1* | 8/2003 | Pillar | B60R 16/0315 701/1 |
| 2008/0222417 | A1* | 9/2008 | Downes | G06F 21/36 713/172 |
| 2009/0083022 | A1* | 3/2009 | Bin Mohd Nordin | G06F 9/4401 703/25 |
| 2011/0307589 | A1 | 12/2011 | Reiss | |
| 2012/0303212 | A1* | 11/2012 | Miller | B60Q 5/001 701/36 |
| 2014/0129051 | A1* | 5/2014 | Gautama | H04W 4/40 701/2 |
| 2016/0306704 | A1* | 10/2016 | Smith | G06F 11/1451 |
| 2017/0368982 | A1* | 12/2017 | Dellock | B60Q 1/24 |
| 2018/0039917 | A1* | 2/2018 | Buttolo | G06Q 10/02 |
| 2018/0059913 | A1* | 3/2018 | Penilla | B60W 40/08 |
| 2020/0180524 | A1* | 6/2020 | Deschenes | G05B 19/042 |
| 2020/0215962 | A1* | 7/2020 | Brower | H04L 12/417 |

FOREIGN PATENT DOCUMENTS

| | | |
|---|---|---|
| GB | 2356111 A | 5/2001 |
| TW | 201411544 | 3/2014 |
| WO | 0197523 A1 | 12/2001 |

OTHER PUBLICATIONS

First Office Action issued in Taiwan Patent Application No. 109108497, dated Jul. 17, 2023.
Summons to attend oral proceedings issued in corresponding European Application No. 20716660.4-1203, dated Sep. 14, 2023.
Brief communication issued in corresponding European Application No. 20716660.4-1203, dated Feb. 5, 2024.
Report of consultation issued in corresponding European Application No. 20716660.4-1203, dated May 14, 2024.
Minutes of the oral proceeding issued in corresponding European Application No. 20716660.4-1203, dated May 21, 2024.

* cited by examiner

| Assign Installation ID | | | |
|---|---|---|---|
| ☑ ALL CONNECTED DEVICES | SERIAL NUMBER | CURRENT ID | CONFIG MATCH |
| ☐ Remote 16 Expansion | 0000000620303134533457170020025 | 2 | |
| ☐ Remote 16 Expansion | 0000000620303134533457170020025 | 1 | |
| ☐ 21 and Slide WCX | 000000015203353536523457130021001d | Unassigned | |
| ☐ WeCanX Lightbar | 00000004203736344134570900020003c | Unassigned | |
| ☐ Traffic Advisor | 0000000320323735359e510c004c0041 | Unassigned | |
| ☐ WeCanX Front Inner Edge | 000000aa203935332534571800350001c | Unassigned | |
| ☐ WeCanX Rear Inner Edge | 000000b20393532534570d0025003a | Unassigned | |
| ☐ External Siren | 00000001b377038363437510300042005c | N/A | |
| ☐ Howler | 00000001c377038363437510300430028 | N/A | |
| ☐ CenCom Core | 0000000d36343332323651000240034 | | |
| ☐ CenCom Core IO | 0000000c203235342e530900 3e002f | | |

Continue    Version 1.3.2.0

FIG. 7

Quick Start

[ Detect via USB ]

Add Hardware

[ Control Head ]
[ Import Device ]
[ Design Lightbar ]
[ Design Inner Edge° ]
[ Traffic Advisor Module ]
[ Output Expansion ]
[ Remote Expansion ]
[ External Siren ]
[ Howler ]
[ Vehicle Options ]
[ V2V Sync Module ]

My Hardware

| CenCom Core | CenCom Core | | |
|---|---|---|---|
| Remote 16 Expansion | Remote 16 Expansion | 1 ▷ | X |
| Remote 16 Expansion (2) | Remote 16 Expansion | 1 ▷ | X |
| 21 and Slide WCX | 21 and Slide WCX | 2 ▷ | X |
| External Siren | External Siren | 1 ▷ | X |
| Howler | Howler | 1 ▷ | X |

STANDARD
CENCOM CORE

Presets ✎

Sirens:
Standby
Radio
T1
T2
T3
Manual + Hands Free
Airhorn
Vehicle:
Park Kill
Horn Ring
Vehicle:
Backlight

[ Go Back ]  [ Continue ]

SYSTEM AND METHOD FOR CONTROLLING MULTIPLE SERIAL CONTROL DEVICES IN AN EMERGENCY VEHICLE

CROSS-REFERENCE TO RELATED APPLICATIONS

This application claims the benefit of priority to U.S. Provisional Application Ser. No. 62/817,723, filed Mar. 13, 2019; which is incorporated in its entirety herein for all purposes.

TECHNICAL FIELD

This invention relates to networked devices in emergency vehicles, and more specifically to a system and method for controlling multiple serial control devices in emergency vehicles.

BACKGROUND

Emergency response vehicles (ERV's), such as police, fire, and ambulance vehicles, often include a number of different devices such as warning lights, sirens, and other peripherals. The devices may be controlled by a central controller or individual controllers.

To ease installation and reduce cost by reducing copper consumption, serial networks are often used to control the lights, sirens and other peripherals within the ERV. Some installations and applications of ERV require multiple instances of a given peripheral, such as multiple lights of the same type. This can lead to difficulties in distinguishing between the multiple instances of the same peripheral in the network. Some networks are incapable of supporting multiple devices of the same type. Others rely upon mechanical dip switches to uniquely identify a device on the network or dedicated ports for each instance of a particular device.

The traditional methods of addressing multiple instances of a peripheral come with disadvantages. Mechanical dip switches are prone to failure particularly in the rugged operating environments of ERVs. Alternate means of binary encoding, via loops of cut and uncut wires, is disadvantageous making re-addressing difficult. Having dedicated ports on a controller for each instance of a particular device is costly especially given that the additional ports may go unused in certain configurations. Dedicated ports are also finite and therefore cannot accommodate unforeseen use cases requiring more peripherals than the controller might support.

There exists a need to attach different types of peripherals in varying quantities to a network within an ERV such that each peripheral is individually addressable and available for input and output operations by a network controller.

SUMMARY OF THE INVENTION

An object of the present disclosure is to provide a system and method for effectively configuring and controlling multiple serial devices in an emergency response vehicle.

In one aspect, a system for operating multiple serial devices in an emergency response vehicle is provided including a plurality of peripheral devices, each configured to receive and store an address. A controller is in communication with the plurality of peripheral devices and is configured to transmit addressable commands to each of the plurality of peripheral devices. At least two of the plurality of peripheral devices have a first device type and, in some embodiments, at least one of the plurality of peripheral devices has a second device type. The addresses of each of the plurality of peripheral devices are selectable by a user.

In another aspect, there is a method of configuring multiple serial devices in an emergency response vehicle including steps of: selecting a plurality of peripheral devices, each configured to receive and store an address, wherein at least two of the plurality of peripheral devices have a same device type; connecting each of the plurality of peripheral devices to a network; detecting, via a computer executing configuration software, each of the plurality of peripheral devices; receiving an input via the computer indicative of an address for at least one of the plurality of peripheral devices; and storing the address in a storage medium associated with the at least one of plurality of peripheral devices.

In yet another aspect of the present disclosure, there is a computer-readable storage medium having computer readable program instructions, the computer readable program instructions read and executed by at least one processor for performing a configuration method. The method includes detecting each of a plurality of peripheral devices connected to a serial network, two or more the peripheral devices having a same device type, and displaying, via a user interface, data indicative of each of the plurality of peripheral devices connected to the serial network. The method further includes receiving, via the user interface, a user selection of one of the two or more the peripheral devices having the same device type, and user input indicative of an address to assign to the one of the plurality of peripheral devices for receiving commands from a controller. The method further includes associating the address with the one of the plurality of peripheral devices and storing the address.

BRIEF DESCRIPTION OF THE DRAWINGS

The present disclosure will become more readily apparent from the specific description accompanied by the drawings.

FIG. 7 is another user interface generated by the software application for configuring the system; and FIG. 8 is another user interface generated by the software application for configuring the system.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Figure 1:
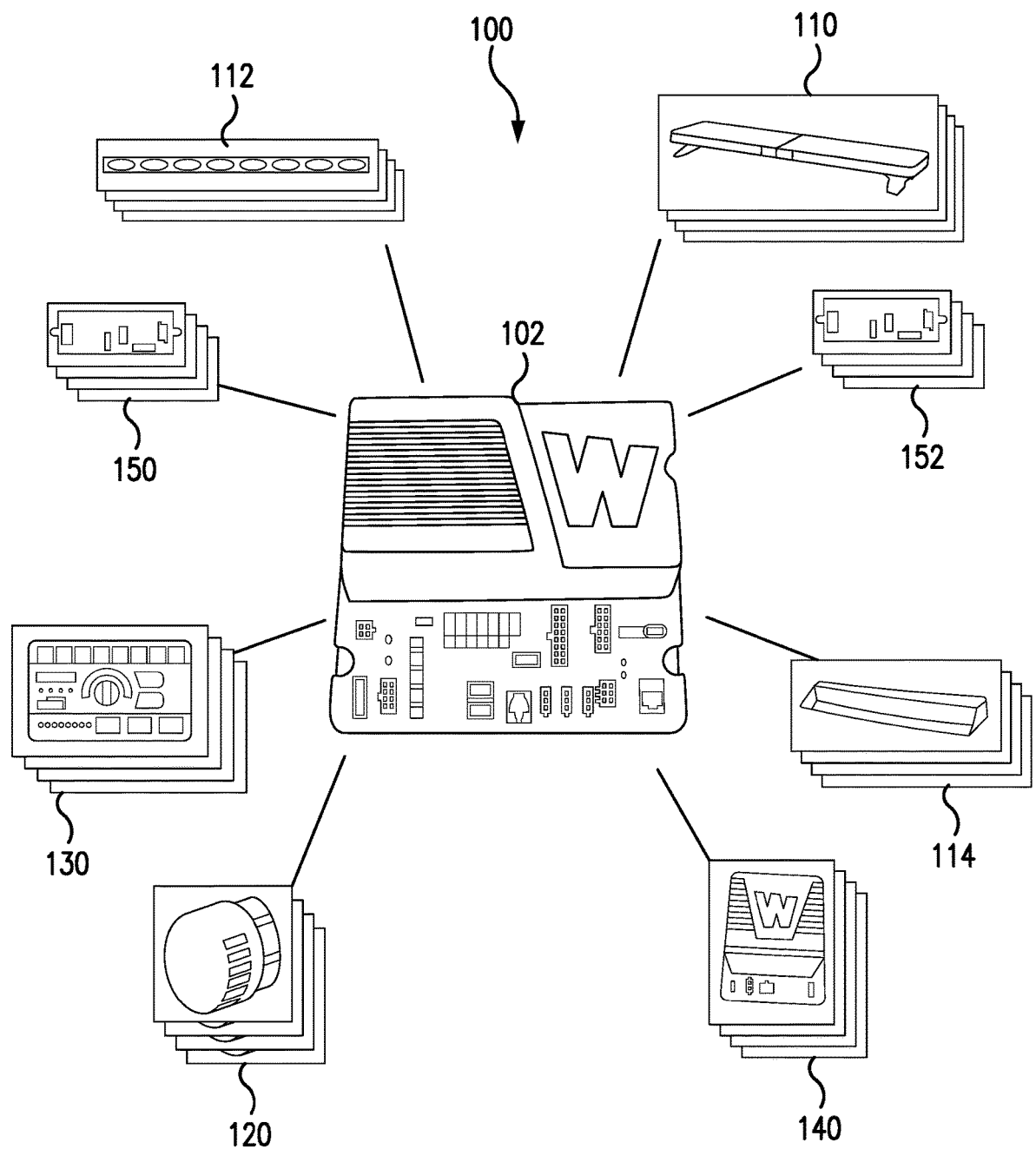
FIG. 1 is a block diagram of a system according to an exemplary embodiment of the present invention.

FIG. 1 is a diagram of a system 100 according to an exemplary embodiment of the present invention. The system 100 includes a controller 102 and a plurality of peripheral devices each in communication with the controller 102, e.g., via a serial network. There are several different types of peripheral devices and, for at least some of the types, there are multiple instances (e.g., without limitation, 2 . . . n) present in the system 100. For example, the system 100 may include one or a plurality of light bars 110. The system may also include one or a plurality of traffic lights 112 and/or inner edge lights 114. The system may also include one or a plurality of sirens 120. The sirens 120 illustrated in FIG. 1 are one type of low frequency siren however it should be understood that any number of different sirens and siren types may be used in place of or together the illustrated sirens 120. Other peripherals may include, for example, one or a plurality of control heads 130, remote siren modules 140, and output expansion modules 150/152. These are only exemplary and not intended to limit the types of peripheral devices that may connect to and operate within the system 100.

For each device type, there may, in some embodiments, be a primary device, a secondary device, and/or at least one ancillary device. The controller 102 is configured to send addressable commands to each peripheral device including any primary, second, and ancillary devices. Each peripheral device is configured to accept and store an address and respond to commands addressed only to itself. The address for a device may be stored in a storage medium within or otherwise associated with the device. In some embodiments, the addresses may be stored in a common storage medium accessible by each of the devices.

Figure 2:
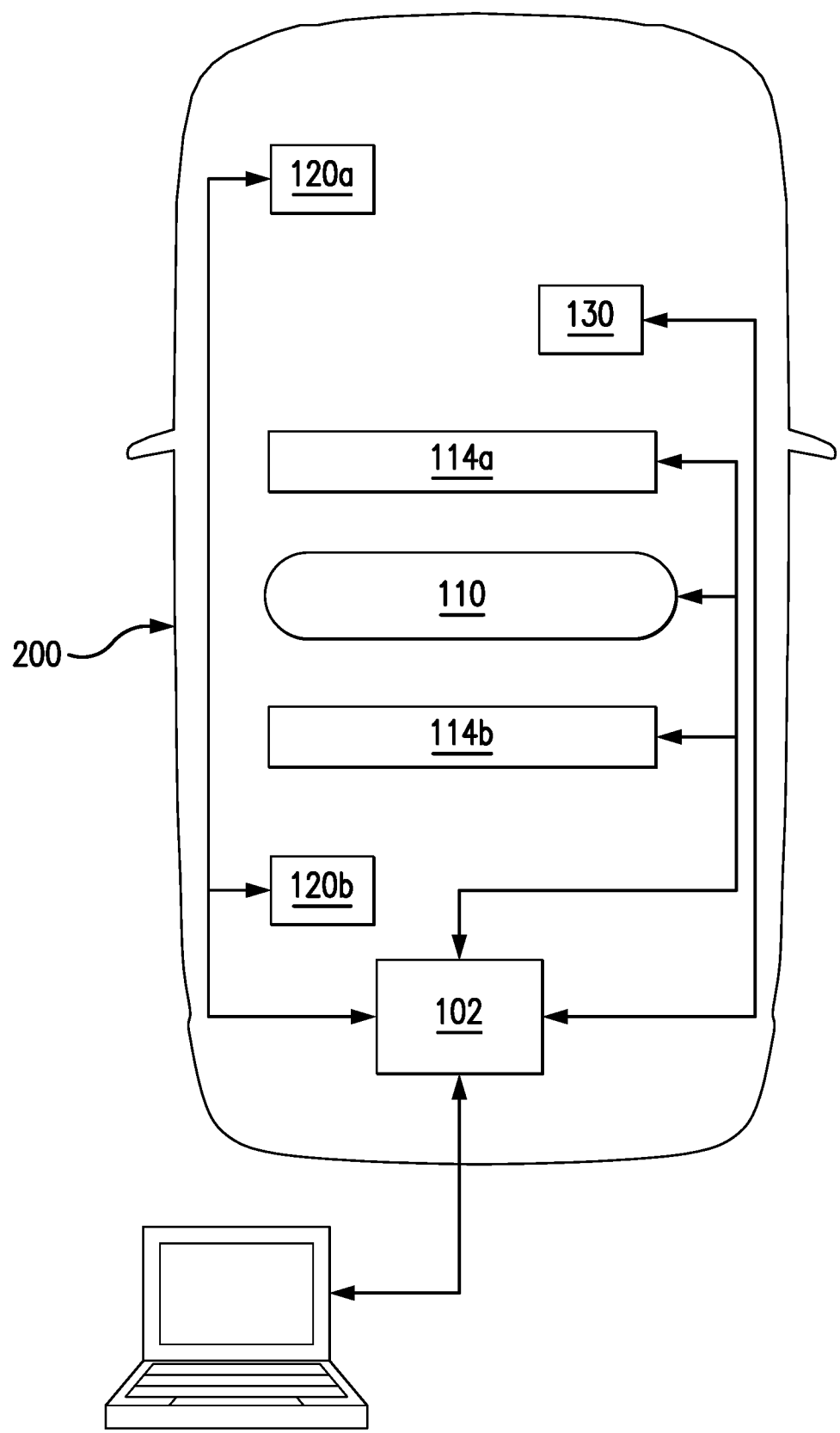
FIG. 2 illustrates an embodiment of the system of FIG. 1 installed in a vehicle.

FIG. 2 is a schematic illustration of a vehicle 200, such as an emergency response vehicle, including an embodiment of the system 100 according to the present invention. The vehicle 200 has a plurality of peripheral devices installed therein including more than one instance of the same peripheral device. In the present example, there are two sirens 120a/120b and two edge lights 114a/114b. However, in other embodiments and arrangements, there may be additional sirens 120, edge lights 114, and other peripheral devices. Each of the peripheral devices are connected to the controller 102 installed in the vehicle 200 via a serial network. For example, the peripheral devices may connect to the controller 102 and/or one another via a Controller Area Network (CAN). The controller 102 is configured to send addressable commands to each peripheral device, and the peripheral devices are each configured to accept and store an address and respond to commands addressed only to itself.

The peripheral devices and/or the controller 102 are configured to connect, such as by a wired connection or wirelessly, to at least one computer 210. The computer 210 includes at least one processor and at least one storage medium. The system 100 includes a software application, executable on a processor, for configuring (or reconfiguring) the system 100.

The computer 210 may be installed in the vehicle 200 or may only be connected to the controller 102 vehicle 200 and/or each device during configuration (or reconfiguration) of the system. In some instances, the computer 210 and associated software may be used for configuring devices prior to installation of any of the devices in the vehicle 200. Thus, the system is useful for installers as well as end users and fleet managers.

In the exemplary embodiment, the software application is stored on the storage medium and executed on the processor of the computer 210. The software application allows a user to specify the address of each peripheral device and create instructions targeting a specific device type and address. For example, the software application may generate a display to receive user input indicative of an address to at least one peripheral device. Such software may operate to configure the devices prior to, during or after installation of the devices in the vehicle 200.

Figure 3:
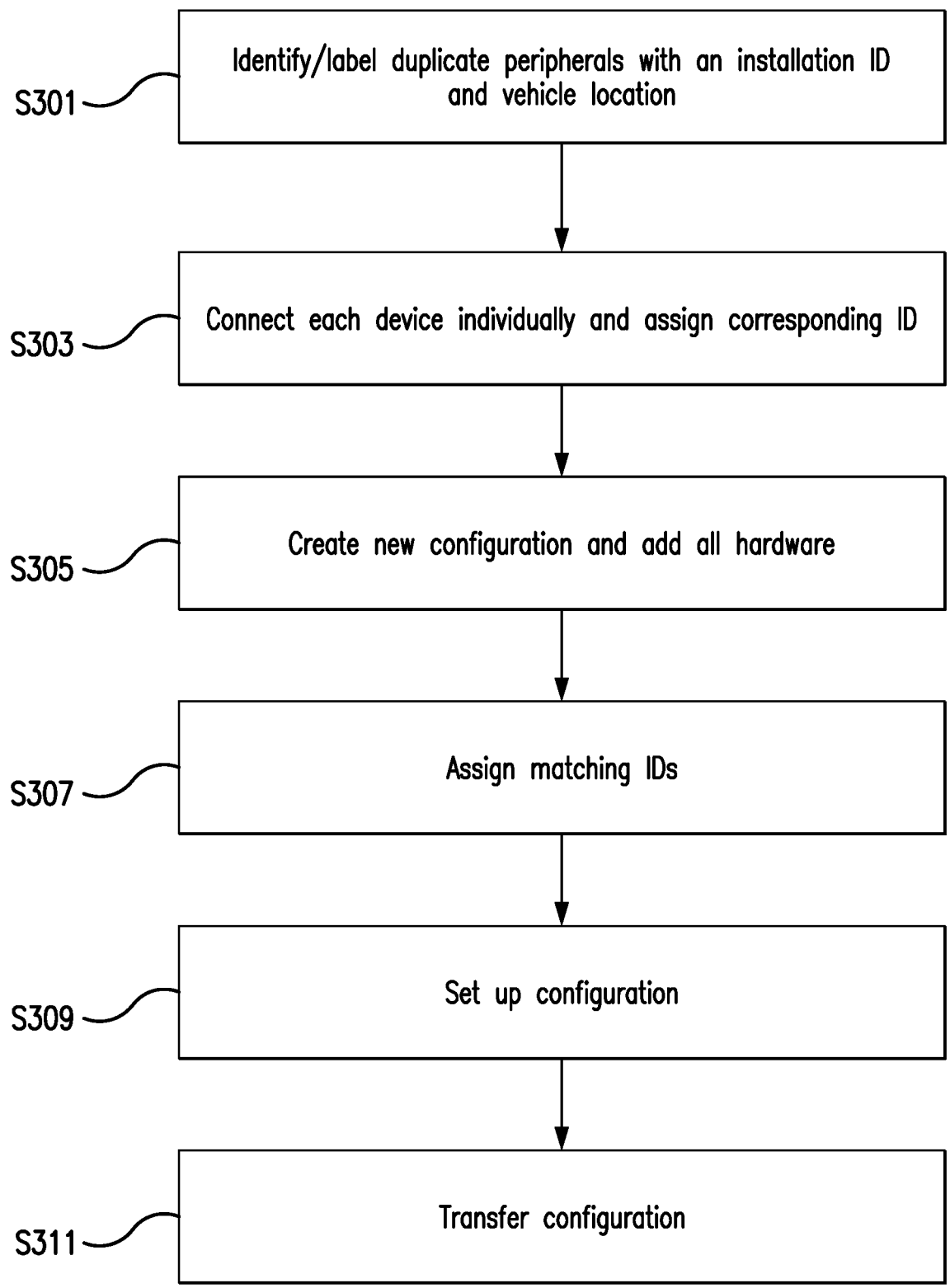
FIG. 3 is a flow chart illustrating a method of configuring the system.

FIG. 3 is a flow chart illustrating a method and process of configuring the system according to an exemplary embodiment of the present invention. The method is carried out, at least in part, using the software application executing on a processor such as the processor of the computer 210. The method includes a step S301 of identifying or labelling any duplicate peripherals with an installation ID and a vehicle location. This may be done, for example, by applying physical labels to each device or by electronically recording and/or capturing images of the peripherals. Step S303 of the method includes connecting each of the devices into the system, e.g., to the controller 102 via a network, and assigning corresponding ID's using the software application. In some embodiments, it is necessary or desirable to select a series or category of products that the user wishes to assign. In a step S305, a new configuration is created (e.g., for a vehicle 200) and all associated hardware is added to the configuration. In a step S307, previously determined or newly created ID's are assigned to devices in the configuration. The configuration is then set up (step S309) and transferred to the vehicle or controller therein (step S311).

Figure 4:
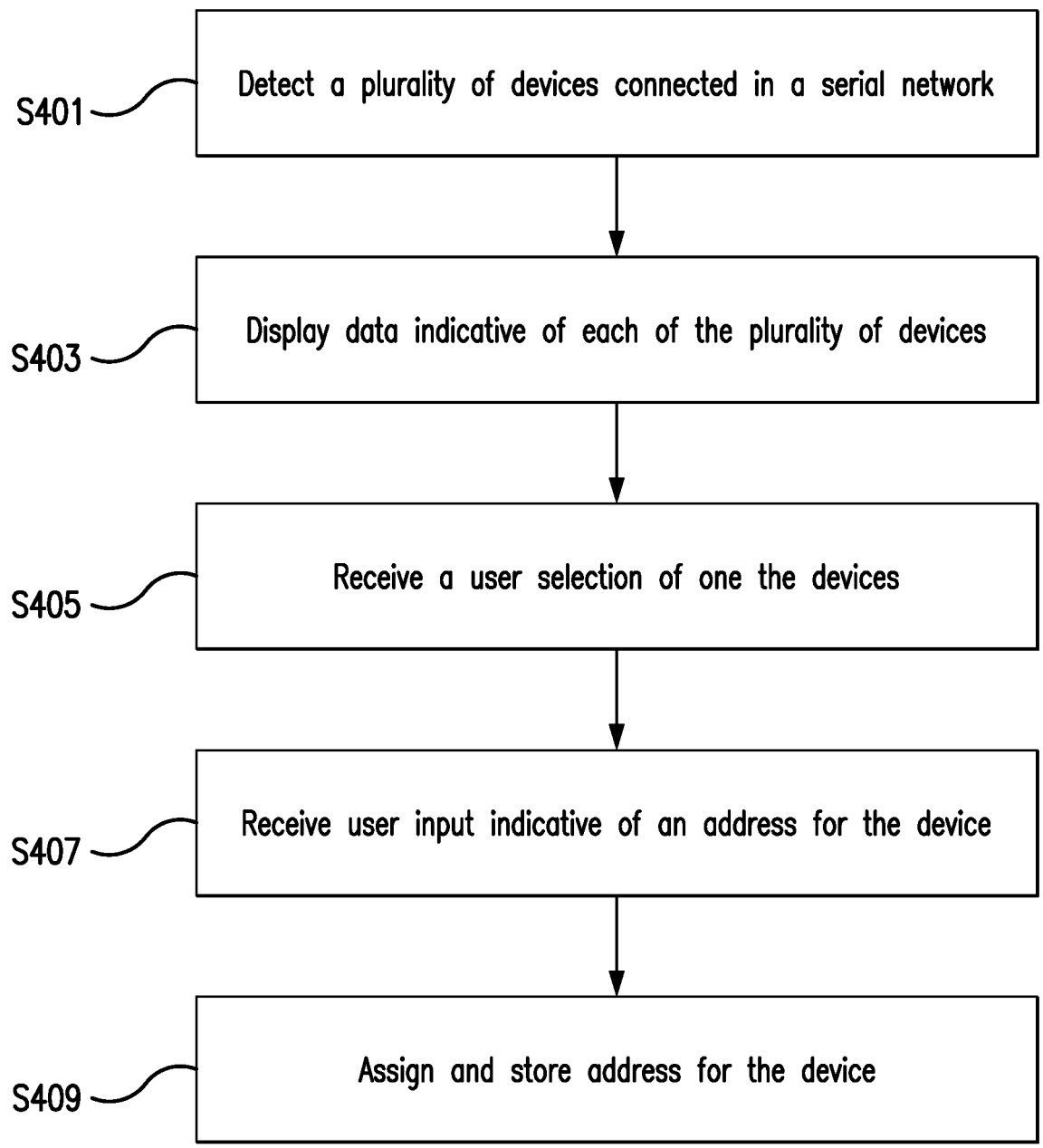
FIG. 4 is another flow chart illustrating a method of configuring the system.

FIG. 4 is another flow chart illustrating a method and process of configuring the system according to an exemplary embodiment of the present invention. The method is carried out, in whole or in part, using the software application executing on a processor such as the processor of the computer 210. The method includes a step S401 of detecting all or at least some of a plurality of devices connected to a controller and/or one another in a serial network. The serial network may, for example, be a Controller Area Network within a vehicle.

In step S403, a display is generated providing data indicative of the plurality of devices that are detected. The display is preferably interactive to receive user input. A user selection of one of the devices is received, together with or followed by a user input indicative of an address to assign to the device (S405-S407). The address is assigned to the selected device and stored in and/or associated with the device (S409).

The method may further include completing a configuration of the plurality of devices and transferring the configuration and/or data indicative of the devices and their addresses to a vehicle. After configuration, a controller can send addressable messages to each peripheral device, e.g., using a, original/default address for some devices and assigned addresses for some devices. Each device recognizes its address and is able to respond to instructions addressed to it.

Figure 5:
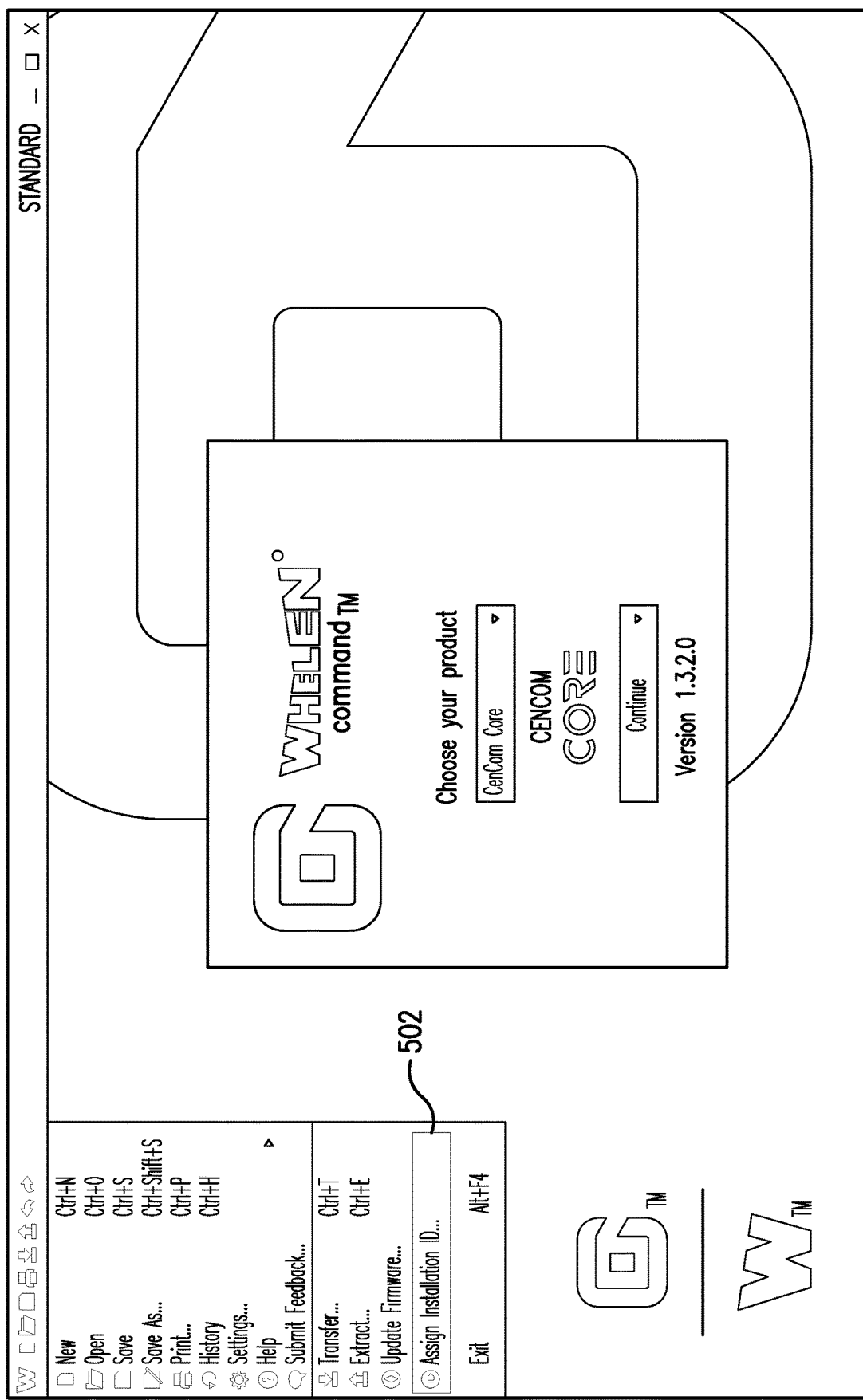
FIG. 5 is a user interface generated by a software application for configuring the system.

FIG. 5 shows a display 500 generated by the software application according to an exemplary embodiment of the present invention. The display 500 includes a menu item 502 for selecting an "assign installation ID" function. Selecting this function initiates the process of addressing the peripherals. In some embodiments, it is necessary or desirable to select a series or category of products that the user wishes to assign. In the exemplary embodiment, the peripherals are associated with a "CenCom Core" product type or project and therefore "CenCom Core" is selected. In other embodiments, the peripherals are associated with a "Falcon" product type or project and therefore "Falcon" is selected. This is only exemplary and any number of different product types or project codes may selected. In some embodiments, no selection is necessary and/or one or more are automatically determined by the system.

Figure 6:
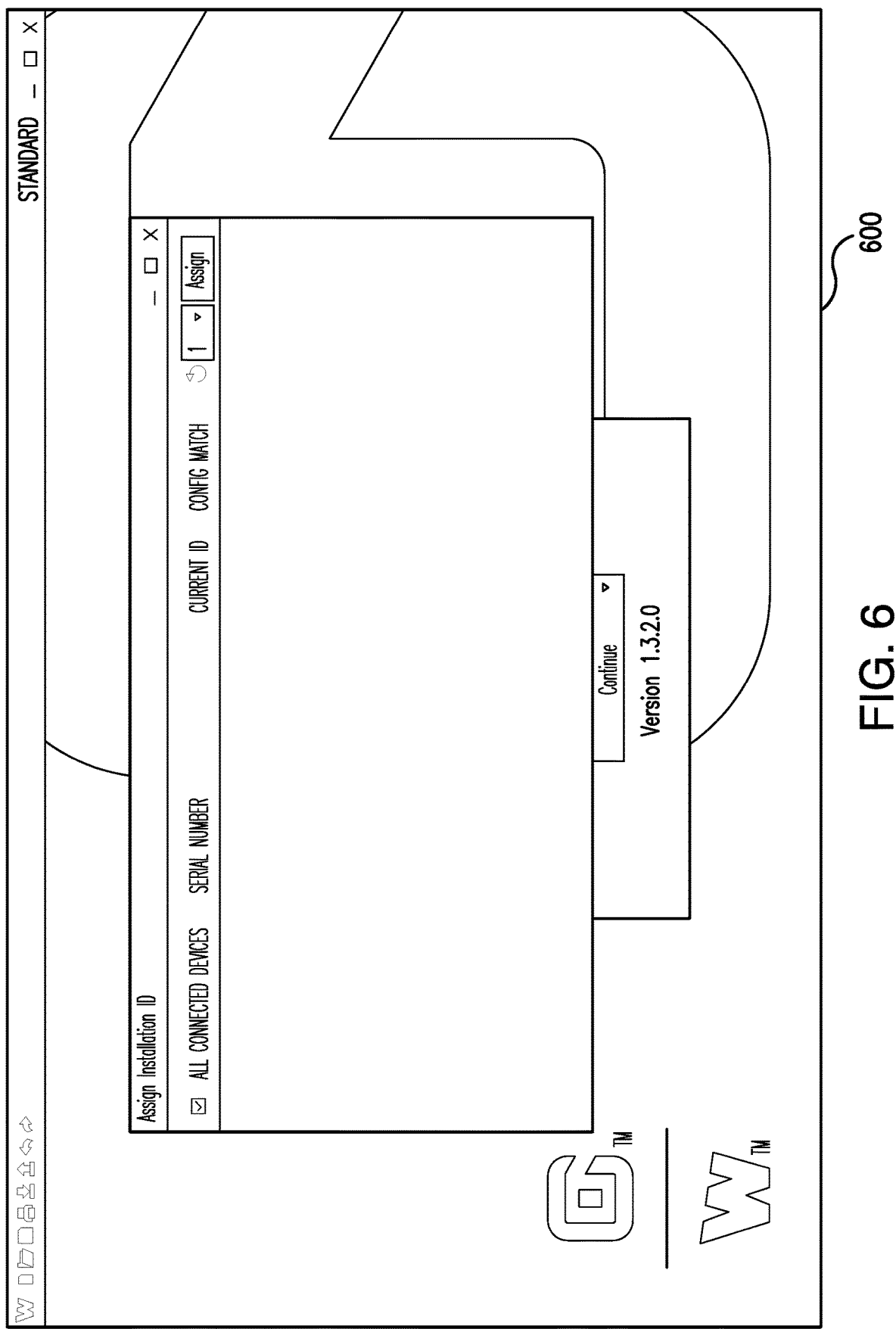
FIG. 6 is another user interface generated by the software application for configuring the system.

Once the assign installation ID function is selected, the system attempts to detect and connect to one or the plurality of peripherals. FIG. 6 illustrates a display 600 generated by the system while it searches for peripherals. Each peripheral is addressable, or necessary to address ancillary peripherals attached to its CAN network port. Once a peripheral, or multiple peripherals, are detected by the system, the software application generates a display indicating each detected peripheral and prompting the user for ID assignment.

FIG. 7 illustrates a display 700 indicating all detected devices at a given time. As shown in FIG. 7, each device may be recognized by a name and/or serial number. The system may pre-assign a default or current ID for some peripherals and/or some peripherals may be unassigned. In some cases, two or more devices may have the same default ID and require changing. The display 700 illustrated in FIG. 7 includes a drop-down menu that allows selection of a unique ID to assign to an unassigned device or to change the current ID of a device. In some embodiments, the ID is the same as the address used by the controller via the network. In other embodiments, the ID is only representative of the address. In the exemplary embodiment, the unique IDs selectable by the user include numerical IDs ranging from 1-99. However, other embodiments may have an increased range of numerical IDs, alphanumeric IDs, or both. Once a user selects a unique ID and clicks assign in display 700, the new ID (and/or address) is stored on the assigned device in a memory location and the system completes assignment of the ID to the device.

FIG. 8 is another display generated by the system and/or the software application thereof. A user may create or edit a configuration for a particular application or vehicle under "My Hardware" and map the devices to that configuration. As shown in FIG. 8, a user may manipulate the device ID drop down and, by memory or reference, align the configuration ID for each of the peripherals attached to the CAN network that they wish to assign instructions to.

As noted above, after a configuration is complete, the configuration or portions thereof may be transferred. For example, the configuration including information concerning the devices and addresses of each device may be transferred to the vehicle 200 and/or controller 102. In some embodiments, the information includes information identifying which of a group of devices of the same type is the primary device, the secondary device, and the ancillary device(s).

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A system for operating multiple serial devices in an emergency response vehicle, comprising:
a plurality of peripheral devices installed in an emergency response vehicle, at least three of the plurality of peripheral devices having a first device type and each being identified as a primary device, a secondary device, or an ancillary device, each of the plurality of peripheral devices configured to receive addressable commands and receive and store an address;
a controller installed in the emergency response vehicle in communication with the plurality of peripheral devices and configured to transmit addressable commands to each of the plurality of peripheral devices; and
a non-transitory storage medium including software executed by at least one processor;
wherein the software detects each of the plurality of peripheral devices in communication with the controller;
wherein the software generates an interactive display including data indicative of each of the plurality of peripheral devices in communication with the controller, the data including a device type for each of the plurality of peripheral devices, and wherein the data indicative of each of the plurality of peripheral devices in communication with the controller is collectively displayed at the same time on the interactive display;
wherein the addresses of each of the plurality of peripheral devices are selectable by a user to create a configuration and duplicate peripheral devices of a same device type are identified with an installation ID and a vehicle location, the software receiving via the interactive display a user specified address for at least one of the plurality of peripheral devices, and
wherein the configuration is transferred to the controller of the emergency response vehicle.

2. The system of claim 1, wherein at least one of the plurality of peripheral devices has a second device type.

3. The system of claim 1, wherein the software receives a first user specified address for one of the at least two peripheral devices having the first type and a second user specified address for another one of the at least two peripheral devices having the first type, the first user specified address being different from the second user specified address.

4. The system of claim 1, wherein each of the plurality of peripheral devices and the controller are connected in a serial network.

5. The system of claim 4, wherein the serial network is a CAN network.

6. The system of claim 1, wherein the plurality of peripheral devices includes at least one light bar, at least one siren, or at least one control head.

7. The system of claim 1, wherein the first device type is a light bar.

8. The system of claim 1, wherein the first device type is a siren.

9. The system of claim 1, wherein the first device type is one of a traffic light or an inner edge light.

10. The system of claim 1, wherein the first device type is one of a control head, a remote siren module, or an expansion module.

11. The system of claim 1, wherein the addressable commands for each of the plurality of peripheral devices are creatable by the user, the software receiving via the interactive display a user created command for at least one of the plurality of peripheral devices.

12. The system of claim 1, wherein one or more of the user created commands are addressable to the peripheral devices having a first device type.

13. The system of claim 1, wherein the non-transitory storage medium is coupled to the system only as needed to execute the software.

14. The system of claim 1, wherein the software first generates an initial interactive display including at least basic data indicative of every device of the plurality of peripheral devices detected at that time.

15. A method of configuring and operating multiple serial devices in an emergency response vehicle, comprising steps of:
    selecting a plurality of peripheral devices, each of the plurality of peripheral devices configured to receive addressable commands and receive and store an address, wherein at least three of the plurality of peripheral devices have a same device type and each are identified as a primary device, a secondary device, or an ancillary device;
    connecting each of the plurality of peripheral devices to a network in the emergency response vehicle;
    detecting, via a computer executing configuration software, each of the plurality of peripheral devices;
    displaying, via the computer, data indicative of each of the detected plurality of peripheral devices including a device type for each of the detected plurality of peripheral devices, and wherein the data indicative of each of the plurality of peripheral devices in communication with the controller is collectively displayed at the same time on an interactive display;
    receiving an input via the computer indicative of an address and an installation ID and a vehicle location for at least one of the plurality of peripheral devices having the same device type;
    storing the address in a storage medium associated with the at least one of plurality of peripheral devices; and
    creating a configuration indicative of each of the plurality of peripheral devices, including the address for each of the plurality of peripheral devices; and
    transferring the configuration to the controller of the emergency response vehicle.

16. The method of claim 15, further comprising a step of displaying data, via the computer, indicative of each of the detected plurality of peripheral devices.

17. The method of claim 15, wherein at least one of the transferred addresses is a default address and at least one of the transferred addresses is a user selected address.

18. The method of claim 15, wherein the storage medium is in the at least one of the plurality of peripheral devices.

19. The method of claim 15, wherein the storage medium is a common storage medium accessible by each of the plurality of peripheral devices.

20. A non-transitory computer-readable storage medium having computer readable program instructions, the computer readable program instructions read and executed by at least one processor for performing a configuration method, the method comprising:
    detecting each of a plurality of peripheral devices connected to a serial network in an emergency response vehicle, three or more of the peripheral devices having a same device type, wherein each of the plurality of peripheral devices is configured to receive addressable commands;
    displaying, via a user interface, data indicative of each of the plurality of peripheral devices connected to the serial network, the data including a device type for each of the plurality of peripheral devices, and wherein the data indicative of each of the plurality of peripheral devices in communication with the controller is collectively displayed at the same time on the user interface;
    receiving, via the user interface, a user selection of one of the three or more peripheral devices having the same device type;
    receiving, via the user interface, user input indicative of an address and an installation ID and a vehicle location to assign to the one of the plurality of peripheral devices having the same device type for receiving commands from a controller;
    receiving an identifier, being one of primary, secondary, or ancillary, for each of the three or more of the plurality of peripheral devices having the same device type;
    associating the address and the identifier with the one of the plurality of peripheral devices and storing the address; and
    creating a configuration indicative of each of the plurality of peripheral devices, including an address for each of the plurality of peripheral devices; and
    transferring the configuration to the controller of the emergency response vehicle.

21. The non-transitory computer-readable storage medium of claim 20, wherein the serial network is a CAN network.

22. The non-transitory computer-readable storage medium of claim 20, wherein the same device type is one of a light bar or a siren.

* * * * *